United States Patent
Prasad et al.

(10) Patent No.: US 12,316,600 B1
(45) Date of Patent: May 27, 2025

(54) DYNAMIC SYSTEMS FOR MIGRATING SPAM-INDUCED RESOURCE STARVATION DOMAIN NAME SEARCH METHODS OF USE THEREOF

(71) Applicant: Go Daddy Operating Company, LLC, Tempe, AZ (US)

(72) Inventors: Ankush H. Prasad, Santa Clara, CA (US); Vinit Badrike, Santa Clara, CA (US); Wenbo Wang, Santa Clara, CA (US); David Kellogg, Santa Clara, CA (US); Chungwei Yen, Santa Clara, CA (US); Larry Lai, Santa Clara, CA (US)

(73) Assignee: Go Daddy Operating Company, LLC, Tempe, AZ (US)

( * ) Notice: Subject to any disclaimer, the term of this patent is extended or adjusted under 35 U.S.C. 154(b) by 0 days.

(21) Appl. No.: 18/952,752

(22) Filed: Nov. 19, 2024

(51) Int. Cl.
*H04L 61/30* (2022.01)
*H04L 43/062* (2022.01)

(52) U.S. Cl.
CPC ........ *H04L 61/3005* (2013.01); *H04L 43/062* (2013.01)

(58) Field of Classification Search
CPC .................... H04L 61/3005; H04L 43/062
See application file for complete search history.

(56) References Cited

U.S. PATENT DOCUMENTS

| | | | |
|---|---|---|---|
| 6,560,634 B1 * | 5/2003 | Broadhurst | H04L 61/00 709/219 |
| 6,760,746 B1 * | 7/2004 | Schneider | H04L 67/60 709/217 |
| 2017/0195285 A1 * | 7/2017 | Kakhki | H04L 61/3025 |

* cited by examiner

*Primary Examiner* — Brian Whipple
(74) *Attorney, Agent, or Firm* — GREENBERG TRAURIG, LLP

(57) ABSTRACT

In some embodiments, the present disclosure provides an exemplary method that may include steps of receiving a request for a plurality of data items from a computing device; determining at least one pattern for at least one metric associated with the computing device; generating at least one digital code based on the at least one pattern meeting a predetermined metric threshold, the at least one digital code comprising access to a plurality of resources; assigning the at least one digital code to the computing device to form at least one assigned digital code; and allowing access to the plurality of resources to facilitate performing a domain name availability determination for the plurality of data items.

20 Claims, 7 Drawing Sheets

DYNAMIC SYSTEMS FOR MIGRATING SPAM-INDUCED RESOURCE STARVATION DOMAIN NAME SEARCH METHODS OF USE THEREOF

FIELD OF TECHNOLOGY

The present disclosure generally relates to a dynamic system for migrating spam-induced resource starvation in bulk domain name search.

BACKGROUND OF TECHNOLOGY

Typically, a domain name is a string of text that maps to alphanumeric internet protocol address, used to access a website from software devices. The domain name may be a plain text that a user may enter into a browser window to reach a particular website. Typically, domain names are managed by domain registries, which delegate the reservation of domain names to registrars.

SUMMARY OF DESCRIBED SUBJECT MATTER

In some embodiments, the present disclosure provides an exemplary technically improved computer-based method that includes at least the following steps: receiving, by a processor, a request for a plurality of data items from a computing device, the plurality of data items including domain names stored in an external computing device, where the computing device is associated with a particular user; determining, by the processor, at least one pattern for at least one metric associated with the computing device, the at least one pattern for the at least one metric corresponding to historical data associated with the at least one metric over a predetermined period of time; generating, by the processor, at least one digital code based on the at least one pattern meeting a predetermined metric threshold, the at least one digital code comprising access to a plurality of resources; assigning, by the processor, the at least one digital code to the computing device to form at least one assigned digital code; and allowing, by the processor, based on the at least one assigned digital code, access to the plurality of resources to facilitate performing a domain name availability determination for the plurality of data items.

In some embodiments, the present disclosure provides an exemplary technically improved computer-based system that includes at least the following components of at least one processor configured to execute software instructions that cause the at least one processor to perform steps to: receive a request for a plurality of data items from a computing device, the plurality of data items including domain names stored in an external computing device, where the computing device is associated with a particular user; determine at least one pattern for at least one metric associated with the computing device, the at least one pattern for the at least one metric corresponding to historical data associated with the at least one metric over a predetermined period of time; generate at least one digital code based on the at least one pattern meeting a predetermined metric threshold, the at least one digital code comprising access to a plurality of resources; assign the at least one digital code to the computing device to form at least one assigned digital code; and allow, based on the at least one assigned digital code, access to the plurality of resources to facilitate performing a domain name availability determination for the plurality of data items.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
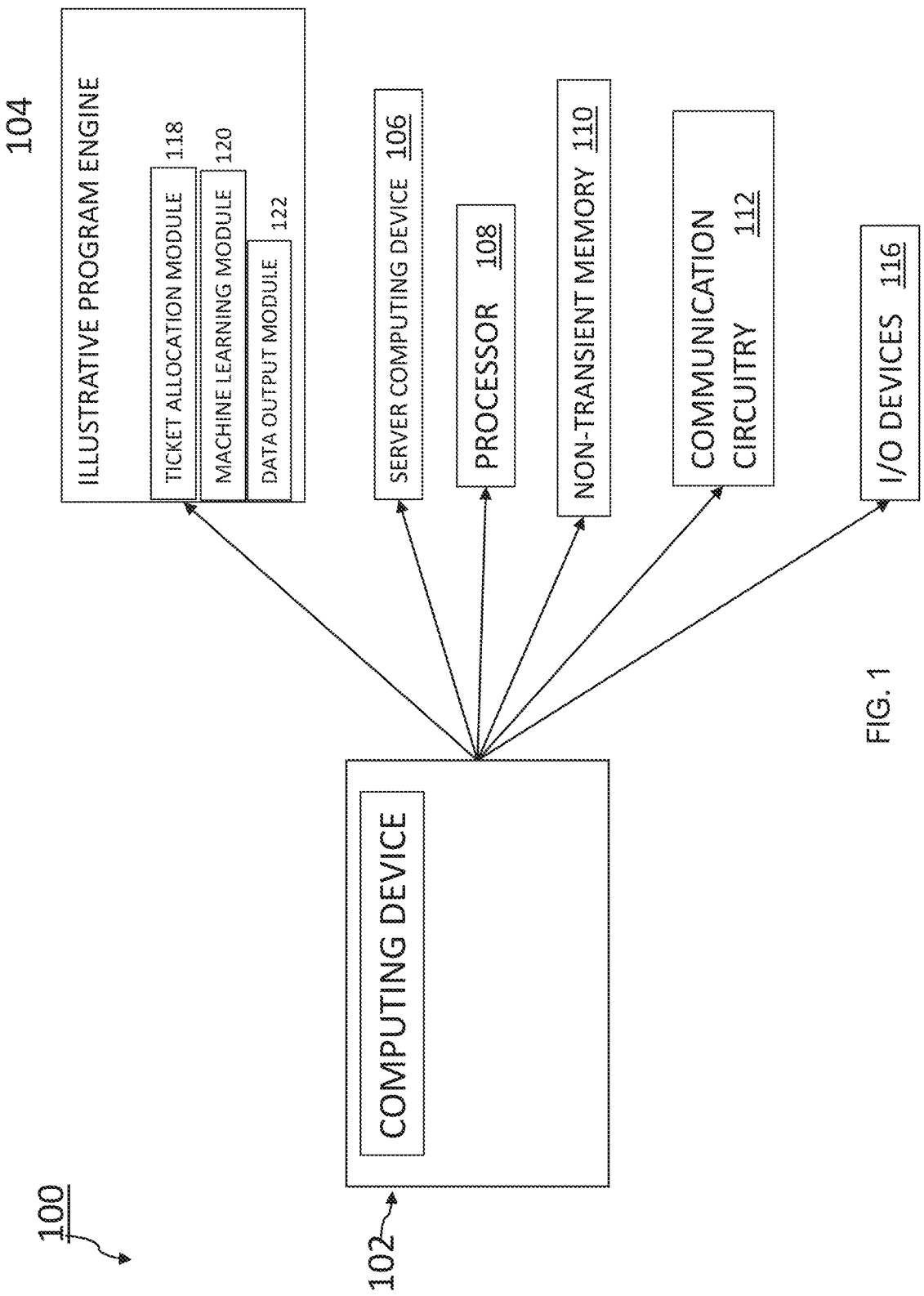
FIG. 1 depicts a block diagram of an exemplary computer-based system and platform for allowing access to a plurality of resources to facilitate performing a domain name availability determination, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

Embodiments of the present disclosure recognize technological computer-centered problems may arise when domain name generation resources become inundated with multiple domain search requests from multiple sources at the same time. Typically, conventional domain name generation resources rely on external devices or manual data manipulation to track, monitor, and verify each domain name search request to each computing device associated with a particular internet protocol (IP) address. This exemplary technical problem may be exacerbated when bad actors attempt to take advantage of the lack of resources to verify each domain name search request, which allows for a generation of an unverified domain name. The unverified domain name may refer to a scammed domain name. At least some embodiments of the present disclosure detail an illustrative computer-centric technological solution that may dynamically allocate search capabilities to a plurality of domain name generation resources via an illustrative dynamically allocated ticket system. In some embodiments, the ticket system may refer to a system that generates and assigns digital tickets to each identified domain name search request. In some embodiments, the system also can dynamically verify, in real-time, metadata associated with each domain name search request and information associated with the computing device connected to the digital ticket. In certain embodiments, the metadata may refer to the substance of the request and time data associated with the search request. In certain embodiments, the information associated with the computing device may refer to the IP address and location associated with the IP address. In some embodiments, the dynamically allocated ticket system may provide access to the computing device associated with a verified search request to facilitate a determination of the domain name availability.

FIG. 1 depicts a block diagram of an exemplary computer-based system and platform for allowing access to a plurality of resources to facilitate performing a domain name availability determination, in accordance with one or more embodiments of the present disclosure.

In some embodiments, a computing system 100 may include a computing device 102 associated with a user and an illustrative program engine 104. In some embodiments, the program 108 may be stored on the computing device 102 such as, without limitation a calling-enabled computing device (e.g., smart phone, iPad™ with calling capability, laptop with calling capability, etc.). In some embodiments, the illustrative program engine 104 may reside, partially or in full, on a server computing device 106 (not shown). In some embodiments, the computing device 102 may include a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, a second or external computing device (not shown) may communicate with the computing device 102.

In some embodiments, the illustrative program engine 104 may be configured to instruct the processor 108 to execute one or more software modules such as a ticket allocation module 118, a machine learning module 120, and a data output module 122.

In some embodiments, an exemplary ticket allocation module 118, of the present disclosure, utilizes at least one machine learning algorithm described herein, to determine a plurality of patterns for a plurality of metrics associated with a computing device 102; generate a digital code based on at least one pattern of the plurality of patterns meeting and/or exceeding a predetermined metric threshold; and assign the digital code to the computing device 102 to allow access to a plurality of resources. In some embodiments, the ticket allocation module 118 may receive a request for a plurality of data items from a computing device 102. In certain embodiments, the plurality of data items may refer to one or more domain names and the request may refer to a domain name search request. In certain embodiments, the one or more domain names may be stored in a domain name database within an external computing device. In certain embodiments, the computing device 102 may be associated with a particular user, specifically an account associated with the particular user. In some embodiments, the ticket allocation module 118 may determine at least one pattern of activity of the plurality of activities associated with the computing device 102. In certain embodiments, the at least one pattern of activity may be associated with at least one metric of a plurality of metrics associated with the computing device 102. In certain embodiments, the plurality of metrics may refer to metadata associated with the domain name search request and/or metadata associated with the computing device 102. In certain embodiments, the pattern of activity may include historical activity associated with the computing device 102 collected over a predetermined period of time. In some embodiments, the ticket allocation module 118 may generate at least one digital code based on the at least one pattern meeting a predetermined metric threshold. In certain embodiments, the predetermined metric threshold may refer to a profile score that reflects positive activity associated with a profile of a user associated with the computing device 102. In certain embodiments, the at least one digital code may refer to the at least one digital ticket. In one embodiment, the digital ticket may refer to a unit of access to a specific resource that can be dynamically allocated based on a user behavior and purchasing profile associated with the computing device 102.

In some embodiments, the ticket allocation module 118 may assign the at least one digital code to the computing device 102 to form an assigned digital code. In certain embodiments, the ticket allocation module 118 may assign a specific number of digital tickets to the computing device 102 based on the metadata associated with the computing device 102 associated with the user. The ticket allocation module 118 may assign particular weights each digital ticket, where the weight may detail a level of resources that the digital ticket may provide access to. For example, the ticket allocation module 118 may assign a certain number of digital tickets according to the account associated with the user, with each digital ticket representing access to a particular resource.

In some embodiments, the ticket allocation module 118 may allow access to the plurality of resources to facilitate performing a domain name availability determination for the plurality of data items. In certain embodiments, a predetermined number of digital tickets may represent a metric threshold, where a determination of whether the computing device 102 associated with the user maintains the predetermined number of digital tickets allows the access to the plurality of resources to facilitate the domain name availability determination. For example, the user is assigned three digital tickets due to account activity over the predetermined period of time, and the ticket allocation module 118 allows access to the plurality of resources as the predetermined metric threshold for access is two digital tickets. In the event the computing device 102 fails to meet the predetermined metric threshold, the ticket allocation module 118 may generate an additional authentication step to preserve the plurality of resources for assigned digital tickets that exceed the predetermined metric threshold and verify the computing device 102 is not associated with a spammer (i.e., bad actor).

In some embodiments, the ticket allocation module 118 may allow access to the plurality of resources to facilitate performing a domain name availability determination for the plurality of data items based on the assigned digital code (i.e., digital ticket). In certain embodiments, the ticket allocation module 118 may generate an additional authentication step in response to the assigned digital ticket associated with the computing device 102 failing to meet the predetermined metric threshold. The additional authentication step may refer to a secondary check that preserves the plurality of resources associated with the domain name availability determination. The secondary check may refer to a honeypot technique and/or a local zone technique to identify identities associated with the spammer attempting to deplete the plurality of resources associated with the domain name availability determination. In certain embodiments, the value and/or weight of the assigned digital ticket may be determined by the profile associated with the computing device 102. In certain embodiments, the ticket allocation module 118 may utilize the trained machine learning module 120 to analyze the profile associated with the computing device 102 to determine the plurality of metrics associated with the profile, where these metrics may include historical spending, recent purchasing activity, margin contributions, and overall engagement with a digital platform associated with the domain name availability determination resources.

In certain embodiments, the trained machine learning module 120 may be trained using the historical data associated with the profile of the user and current collected data that forms the at least one pattern associated with the profile of the user. In certain embodiments, the trained machine learning module 120 prevents excessive resource consumption, where the plurality of resources may be associated with the domain name availability determination. In at least some embodiments, the more present metrics associated with the profile then the higher likelihood of contribution to the plurality of resources through valid transactions, thereby authenticating the profile associated the computing device 102 to access the plurality of resources without additional authentication steps. In some embodiments, the ticket allocation module 118 may utilize the trained machine learning module 120 to access the profile of the user that includes the plurality of metrics (i.e., lifetime spend, recent transaction history, refund patterns, margin contributions, and other behavioral data) to determine the number of digital tickets the profile should receive. For example, authenticated profiles with positive metrics are granted more digital tickets, while those with negative metrics (e.g., suspicious activity) receive fewer tickets.

In some embodiments, the ticket allocation module 118 may utilize the trained machine learning module 120 to dynamically compare the profile of the user to a plurality of profiles associated with other users in real-time. This comparison allows the ticket allocation module 118 to identify the authenticated profile versus low-value and/or suspicious profiles, thereby assigning an appropriate number of digital tickets to the appropriate profile. In some embodiments, the ticket allocation module 118 may utilize the trained machine learning module 120 to continually monitor subsequent activity associated with the profile of the user to determine when the profile of the user depletes their allocated tickets and triggers the generation of the additional authentication steps to prevent further resource consumption.

In some embodiments, the trained machine learning module 120 may determine the at least one pattern for the plurality of metrics associated with the computing device 102. In certain embodiments, the trained machine learning module 120 may determine the pattern of activity based on the plurality of metrics for with the profile associated with the computing device 102. In some embodiments, the trained machine learning module 120 may generate the at least one digital code based on the at least one pattern meeting a predetermined metric threshold, where the at least one digital code may refer to the digital ticket. In certain embodiments, the at least one digital code may refer to a unique string of characters that represent the digital code (i.e., digital ticket). In certain embodiments, the digital ticket may provide access to the plurality of resources associated with the domain name availability determination. In some embodiments, the trained machine learning module 120 may assign the digital code to the computing device 102 to form the assigned digital code. In some embodiments, the trained machine learning module 120 may allow access to the plurality of resources to facilitate performing the domain name availability determination for the plurality of data items based on the assigned digital code.

In some embodiments, the data output module 122 may output the request for the plurality of data items from the computing device 102. In some embodiments, the data output module 122 may output the pattern associated with the computing device 102, where the pattern corresponds to historical data associated with at least one metric over the predetermined period of time. In some embodiments, the data output module 122 may output the at least one digital code based on the pattern meeting the predetermined metric threshold. In some embodiments, the data output module 122 may output the assigned digital code. In some embodiments, the data output module 122 may output the domain name availability determination for the plurality of data items based on the assigned digital code. In some embodiments, the data output module 122 may output the additional authentication steps for a profile that fails to meet the predetermined metric threshold.

In some embodiments, the non-transient memory 110 may store the request for the plurality of data items. In some embodiments, the non-transient memory 110 may store the at least one pattern for the at least one metric associated with the computing device 102. In some embodiments, the non-transient memory 110 may store the at least one digital code. In some embodiments, the non-transient memory 110 may store the assigned digital code. In some embodiments, the non-transient memory 110 may store the domain name availability determination for the plurality of data items.

In some embodiments, the processor 108 may receive a request for a plurality of data items from a computing device 102. In certain embodiments, the plurality of data items may include domain names stored in an external computing device. In some embodiments, the processor 108 may determine at least one pattern for at least one metric associated with the computing device 102. In certain embodiments, the at least one pattern for the at least one metric may correspond historical data associated with the at least one metric over a predetermined period of time. In some embodiments, the processor 108 may generate at least one digital code based on the at least one pattern meeting a predetermined metric threshold. In certain embodiments, the at least one digital code may include access to a plurality of resources. In some embodiments, the processor 108 may assign the at least one digital code to the computing device 102 to form at least one assigned digital code. In some embodiments, the processor 108 may allow access to the plurality of resources to facilitate performing a domain name availability determination for the plurality of data items based on the at least one assigned digital code.

Figure 2:
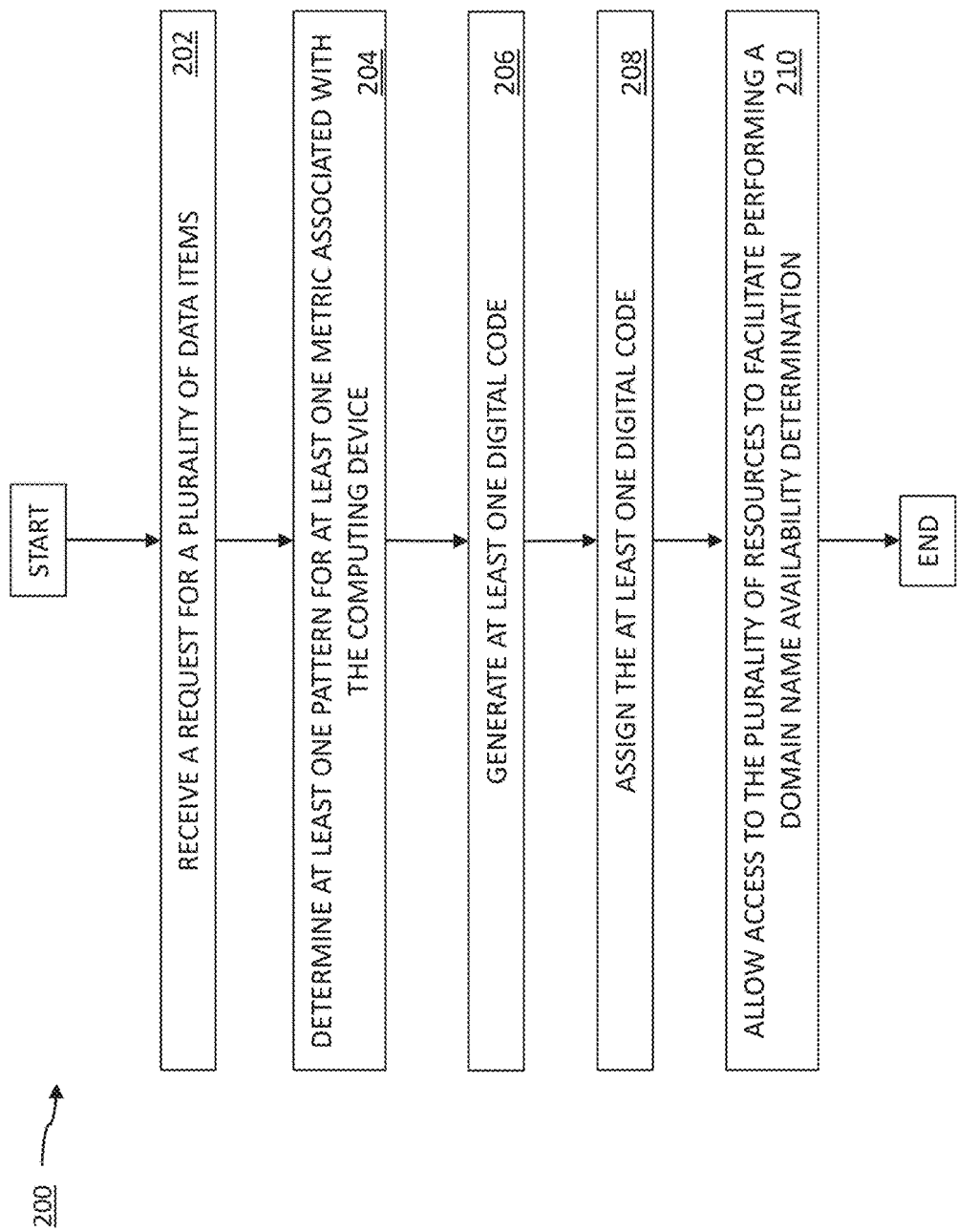
FIG. 2 is a flowchart illustrating operational steps for allowing access to a plurality of resources to facilitate performing a domain name availability determination, in accordance with one or more embodiments of the present disclosure.

FIG. 2 is a flowchart 200 illustrating operational steps for allowing access to a plurality of resources to facilitate performing a domain name availability determination, in accordance with one or more embodiments of the present disclosure.

In step 202, the illustrative program engine 104 within the computing device 102 may be programmed to receive a request for a plurality of data items from a computing device 102. In some embodiments, the illustrative program engine 104 may receive the request for the plurality of data items from the computing device 102, where the plurality of data items may include domain names stored in an external computing device. In certain embodiments, the request may refer to a domain name search request. In some embodiments, the computing device 102 may be associated with a particular user and/or a particular profile of the user. In certain embodiments, the external computing device may refer to a server computing device 106. In some embodiments, the ticket allocation module 118 may receive the request for the plurality of data items from the computing device 102, where the plurality of data items may include domain names stored in an external computing device.

In step 204, the illustrative program engine 104 may determine at least one pattern associated with the computing device 102. In some embodiments, the illustrative program engine 104 may utilize a trained machine learning module 120 to determine the at least one pattern for at least one metric associated with the computing device 102. In some embodiments, the at least one pattern for the at least one metric may be associated with the profile of a user associated with the computing device 102. In certain embodiments, the illustrative program engine 104 may determine a plurality of patterns for a plurality of metrics associated with the computing device 102. In certain embodiments, the pattern for the metric may correspond to historical data associated with the metric over a predetermined period of time. In some embodiments, the ticket allocation module 118 may utilize the trained machine learning module 120 to determine the at least one pattern for at least one metric associated with the computing device 102.

In step 206, the illustrative program engine 104 may generate at least one digital code. In some embodiments, the illustrative program engine 104 may generate the at least one digital code based on the at least one pattern meeting a predetermined metric threshold. In certain embodiments, the at least one digital code may refer to a digital ticket. In certain embodiments, the at least one digital code may provide access to a plurality of resources, where the plurality of resources are associated with a domain name availability determination. In certain embodiments, the illustrative program engine 104 may generate the at least one digital code by utilizing the trained machine learning module 120 to analyze a plurality of factors associated with the profile of the user to generate a profile score; dynamically compare the profile score associated with the profile to a plurality of profile scores associated with other profiles; determine a number of digital tickets to allocate to the profile based on the profile score related to the predetermined metric threshold; and continually monitor activity associated with the profile to determine when the number of digital tickets are consumed to prevent resource consumption. In some embodiments, the plurality of factors may include domain requests, character strokes, available resources, lifetime spend, recent transaction history, refund patterns, margin contributions, and other behavioral data. The profile score may refer to the likelihood that the user is an authenticated and/or verified user, where the higher the profile score, the more tickets may be allocated to the profile. The comparison of the profile scores may occur in real-time. In some embodiments, the ticket allocation module 118 may generate the at least one digital code based on the at least one pattern meeting a predetermined metric threshold. For example, the profile of the user is determined to have a profile score of nine and the predetermined metric threshold for the domain name availability determination is five, therefore the ticket allocation module 118 may generate five digital tickers for the computing device 102 based on the profile score. Also, a different profile for a different user is determined to have a score of four and the predetermined metric threshold for the domain name availability determination remains five, therefore the ticket allocation module 118 may generate an additional authentication step to prevent excessive resource consumption.

In step 208, the illustrative program engine 104 may assign the at least one digital code to the computing device 102. In some embodiments, the illustrative program engine 104 may assign the at least one digital code to the profile associated with the user associated with the computing device 102. In some embodiments, the assigning of the at least one digital code to the computing device 102 to form an assigned digital code. The assignment of the digital code (e.g., digital ticket) provides the user associated with the profile and/or the computing device 102 ownership rights over that digital code and allows the user to access the resources associated with the domain name availability determination. In some embodiments, the ticket allocation module 118 may assign the at least one digital code to the computing device 102 to form an assigned digital code.

In step 210, the illustrative program engine 104 may allow access to the plurality of resources. In some embodiments, the illustrative program engine 104 may allow access to the plurality of resources to facilitate performing a domain name availability determination for the plurality of data items based on the at least one assigned digital code. In some embodiments, the plurality of resources associated with the domain name availability determination are finite, and excess use of the plurality of resources may deplete the resources, preventing authenticated profiles from performing the domain name availability determination. In certain embodiments, the access to the plurality of resources may refer to an ability to perform a domain name search for the plurality of data items (i.e., domain names) in response to the request from the computing device 102. In some embodiments, the ticket allocation module 118 may allow access to the plurality of resources to facilitate performing a domain name availability determination for the plurality of data items based on the at least one assigned digital code.

Figure 3:
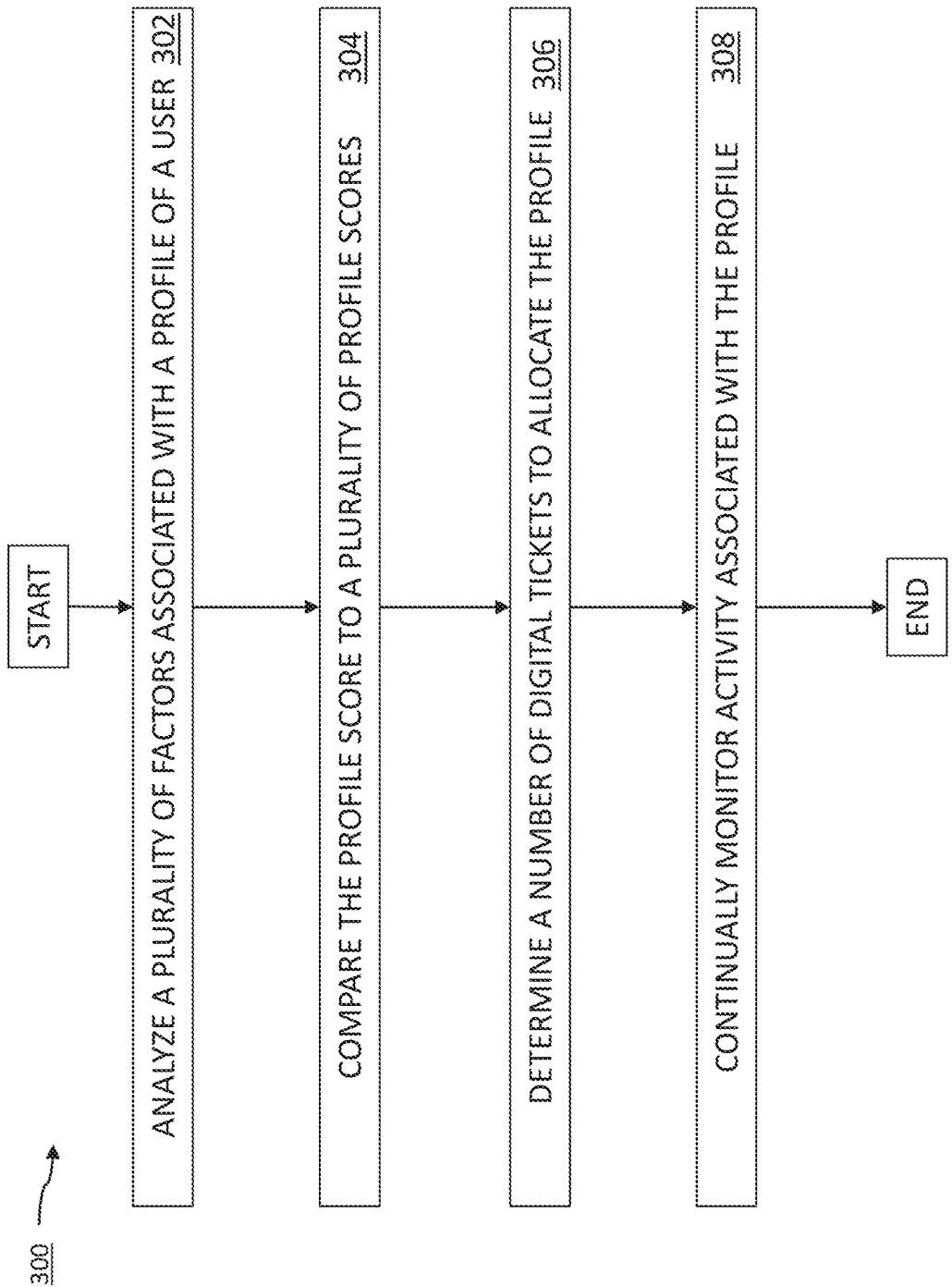
FIG. 3 is a flowchart illustrating operational steps for generating additional authentication steps for a profile associated with a particular user, in accordance with one or more embodiments of the present disclosure.

FIG. 3 is a flowchart 300 illustrating operational steps for generating additional authentication steps for a profile associated with a particular user, in accordance with one or more embodiments of the present disclosure.

In step 302, the illustrative program engine 104 may analyze a plurality of factors associated with the computing device 102. In some embodiments, the illustrative program engine 104 may analyze the plurality of factors to generate a profile score. In some embodiments, the illustrative program engine 104 may utilize the trained machine learning module 120 to analyze the plurality of factors associated with the profile of the user associated with the computing device 102. In certain embodiments, the plurality of factors may include lifetime spend, recent transaction history, refund patterns, margin contributions, and other behavioral data associated with the profile of the user. In some embodiments, the profile score may have a minimum value of one and a maximum value of ten. In some embodiments, the ticket allocation module 118 may analyze a plurality of factors associated with the computing device 102 to generate a profile score.

In step 304, the illustrative program engine 104 may dynamically compare the profile score to a plurality of profile scores associated with other computing devices. In some embodiments, the illustrative program engine 104 may dynamically compare the profile score associated with the profile of the user to a plurality of profile scores associated with other profiles. In certain embodiments, the comparison of profile scores provides a ranking of the plurality of profile scores, where the higher the profile score, the more likely the profile will be allocated the maximum number of digital tickets. In some embodiments, the ticket allocation module 118 may dynamically compare the profile score associated with the profile of the user to a plurality of profile scores associated with other profiles.

In step 306, the illustrative program engine 104 may determine a number of digital codes to allocate to the computing device 102. In some embodiments, the illustrative program engine 104 may determine the number of digital codes to allocate to the profile of the user associated with the computing device 102 based on the profile score, where the profile score meets and/or exceeds the predetermined metric threshold. In certain embodiments, the digital codes may refer to digital tickets that provide access to the plurality of resources associated with the domain name availability determination. For example, when the profile score exceeds the predetermined metric threshold, the ticket allocation module 118 may assign the maximum number of digital tickets to the profile of the user.

In step 308, the illustrative program engine 104 may generate an additional authentication step. In some embodiments, the illustrative program engine 104 may generate the additional authentication step in response to the profile score failing to meet the predetermined metric threshold. In some embodiments, the additional authentication step may refer to a secondary check that authenticates the profile, where the secondary check may refer to a honeypot technique and/or a local zone technique. In some embodiments, the illustrative program engine 104 may generate the additional authentication step to preserve the plurality of resources for verified and authenticated profiles with profile scores that meet and/or exceed the predetermined metric threshold. In some embodiments, the ticket allocation module 118 may generate the additional authentication step in response to the profile score failing to meet the predetermined metric threshold.

In some embodiments, the illustrative program engine 104 may continually monitor activity associated with the computing device 102, namely the profile of the user associated with the computing device 102, to determine when and/or if the number of allocated digital codes are consumed to prevent excessive resource consumption. In some embodiments, the ticket allocation module 118 may continually monitor activity associated with the computing device 102, namely the profile of the user associated with the computing device 102, to determine when and/or if the number of allocated digital codes are consumed to prevent excessive resource consumption. In some embodiments, the illustrative program engine 104 may utilize the trained machine learning module 120 to predict subsequent domain name availability determinations for particular data items from the profile of the user based on previously generated digital codes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile; TM (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the ticket allocation module 118 of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent transactions/users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the exemplary inventive computer-based systems/platforms, the exemplary inventive computer-based devices, and/or the exemplary inventive computer-based components of the present disclosure may be configured to securely store and/or transmit data (e.g., tokenized PAN numbers, etc.) by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 4:
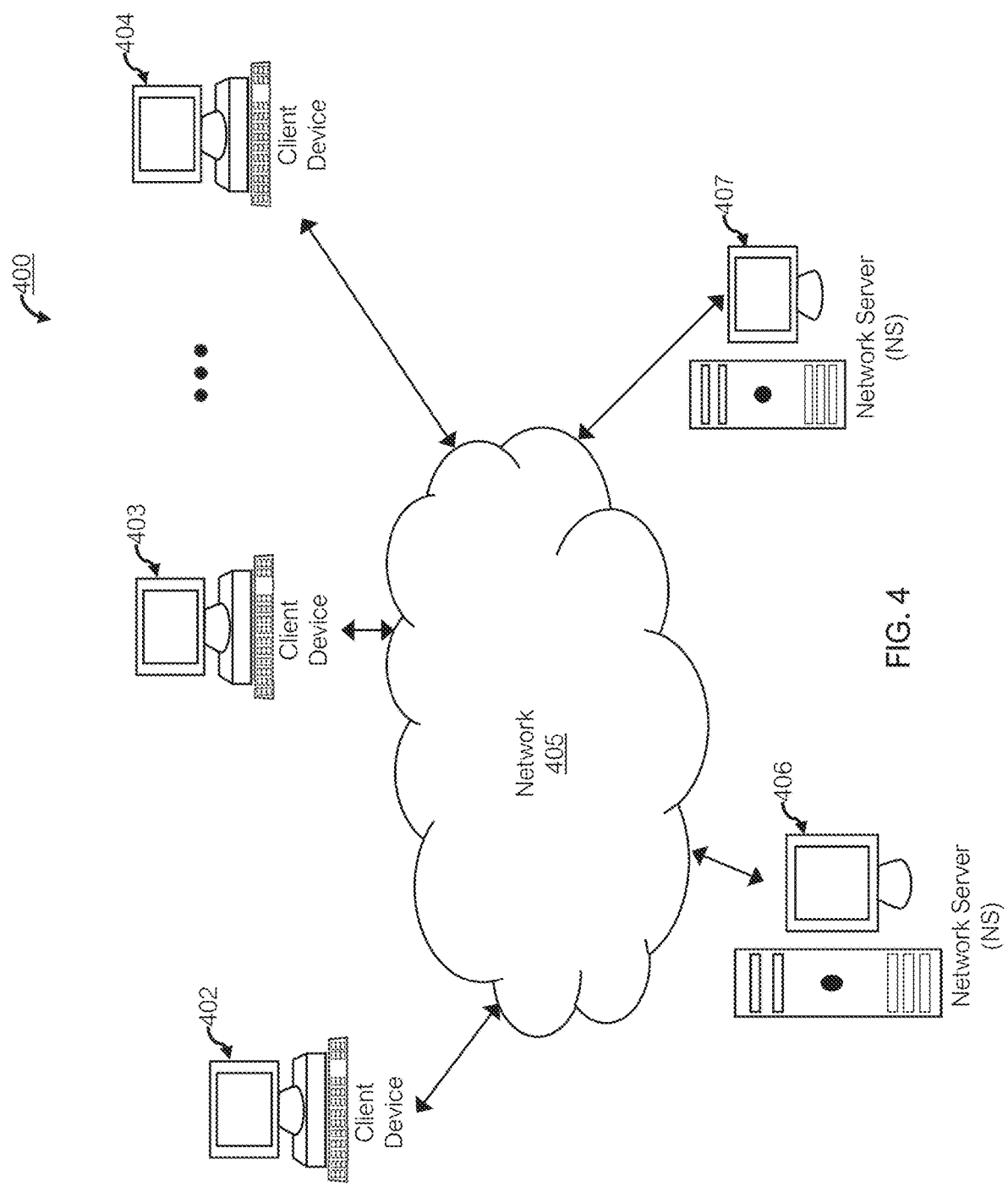
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates various strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the ticket allocation module 118 of the present disclosure, utilizing at least one machine-learning model described herein.

In some embodiments, referring to FIG. 4, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBS, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may run one or more applications, such as Internet browsers, mobile applications, voice calls, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information (e.g., transactions, VCNs, etc.) using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
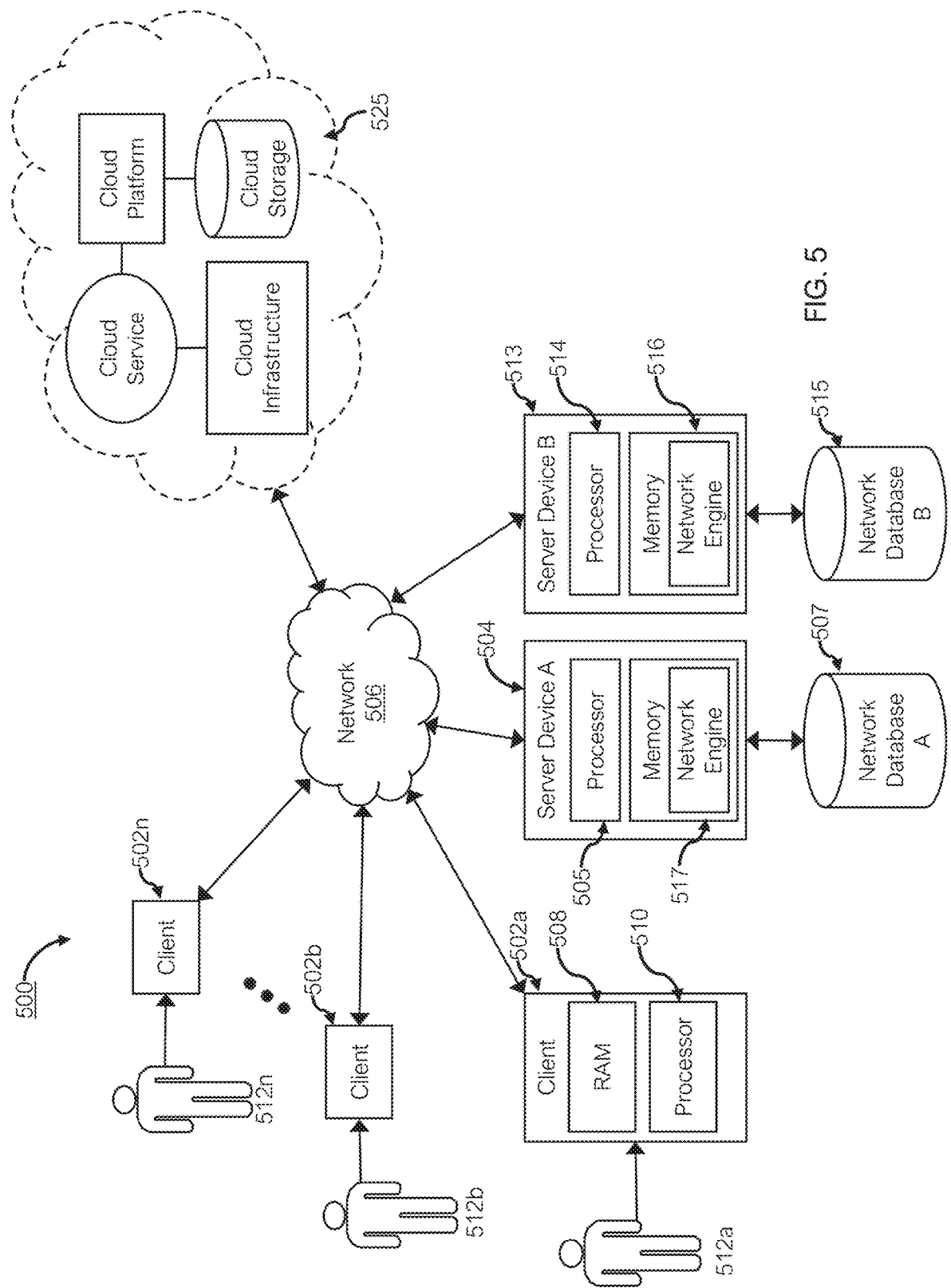
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™, Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
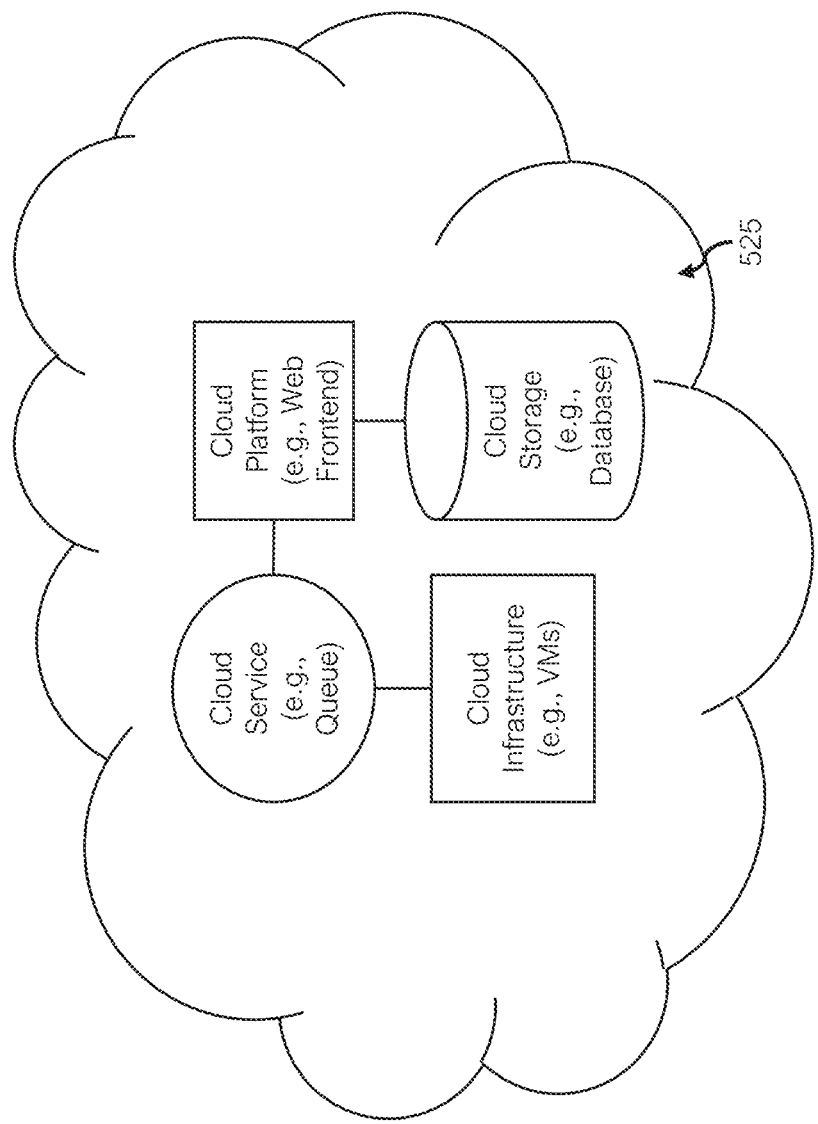
FIGS. 6 and 7 are diagrams illustrating implementations of cloud computing architecture/aspects with respect to which the disclosed technology may be specifically configured to operate, in accordance with one or more embodiments of the present disclosure.
Figure 7:
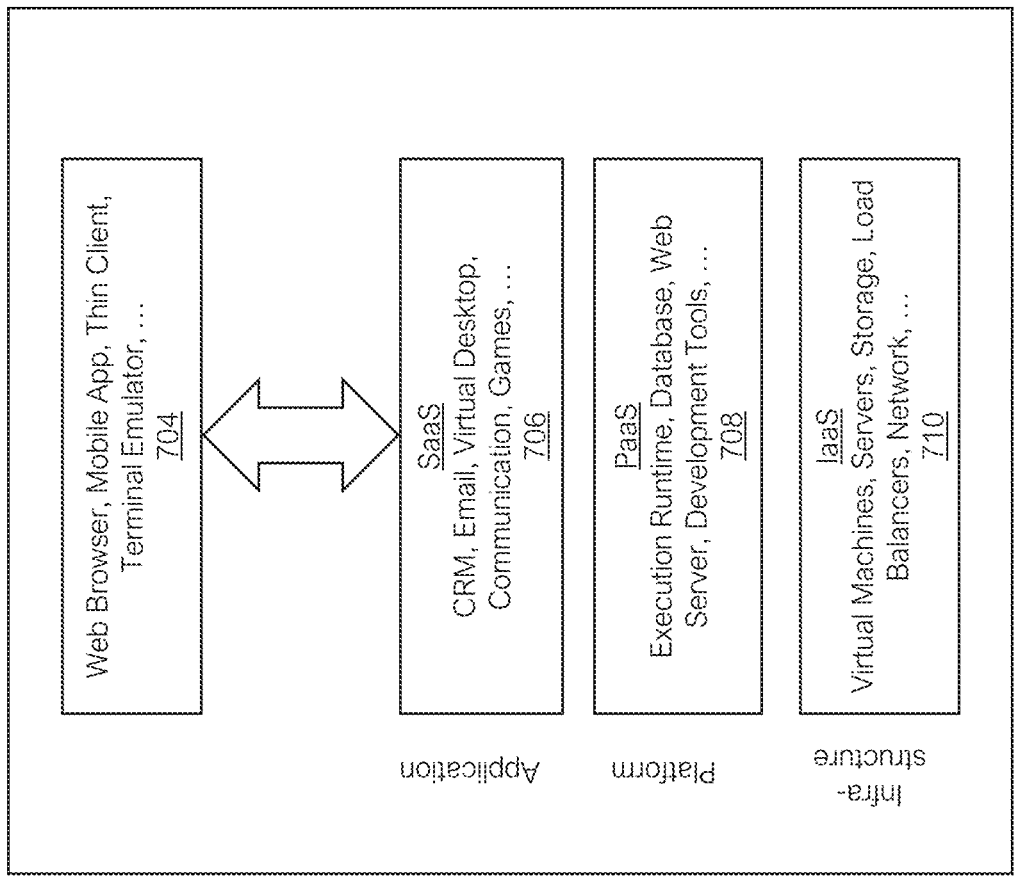

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 710, platform as a service (PaaS) 708, and/or software as a service (SaaS) 706.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, an artificial recurrent neural network model, a long short-term memory ("LSTM") model, and a distributed long short-term memory ("DLSTM") model, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

Clause 1. A computer-implemented method may include: receiving, by a processor, a request for a plurality of data items from a computing device, the plurality of data items including domain names stored in an external computing device; determining, by the processor, at least one pattern for at least one metric associated with the computing device, the at least one pattern for the at least one metric corresponding to historical data associated with the at least one metric over a predetermined period of time; generating, by the processor, at least one digital code based on the at least one pattern meeting a predetermined metric threshold, the at least one digital code including access to a plurality of resources; assigning, by the processor, the at least one digital code to the computing device to form at least one assigned digital code; and allowing, by the processor, based on the at least one assigned digital code, access to the plurality of resources to facilitate performing a domain name availability determination for the plurality of data items.

Clause 2. The method according to clause 1, where the computing device is associated with a particular profile.

Clause 3. The method according to clause 1 or 2, where the particular profile is associated with a particular user.

Clause 4. The method according to clause 1, 2 or 3, where the external computing device includes a server computing device associated with a domain name generation service.

Clause 5. The method according to clause 1, 2, 3 or 4, further includes utilizing a trained machine learning module to determine the at least one pattern for the at least one metric associated with the computing device.

Clause 6. The method according to clause 1, 2, 3, 4 or 5, where the at least one pattern includes a pattern of activity associated with a profile of a user associated with the computing device.

Clause 7. The method according to clause 1, 2, 3, 4, 5 or 6, where the at least one metric includes at least one factor associated with a profile score based on an activity of the at least one pattern.

Clause 8. The method according to clause 1, 2, 3, 4, 5, 6 or 7, where the at least one digital code includes a digital ticket that provides access to the plurality of resources.

Clause 9. The method according to clause 1, 2, 3, 4, 5, 6, 7, or 8, where the predetermined metric threshold includes a required number of digital tickets to facilitate the performance of the domain name availability determination for the plurality of data items.

Clause 10. The method according to clause 1, 2, 3, 4, 5, 6, 7, 8 or 9, where the at least one assigned digital code includes a number of digital tickets for consumption to facilitate the performance of the domain name availability determination.

Clause 11. The method according to clause 1, 2, 3, 4, 5, 6, 7, 8, 9 or 10, the plurality of resources includes a domain availability verification check for the plurality of data items.

Clause 12. The method according to clause 1, 2, 3, 4, 5, 6, 7, 8, 9, 10 or 11, further including utilizing a trained machine learning module to predict subsequent domain name availability determinations for particular data items from the profile of the user based on previously generated digital codes.

Clause 13. The method according to clause 1, 2, 3, 4, 5, 6, 7, 8, 9, 10, 11 or 12, further including utilizing a trained machine learning module to analyze a plurality of factors associated with a profile of a user to generate a profile score; dynamically comparing the profile score associated with the profile of the user to a plurality of profile scores associated with other profiles; determining a number of digital tickets to allocate to the profile based on the profile score in correlation with the predetermined metric threshold; and continually monitoring activity associated with the profile to determine when the number of digital tickets are consumed.

Clause 14. The method according to clause 1, 2, 3, 4, 5, 6, 7, 8, 9, 10, 11, 12 or 13, further including generating additional authentication steps in response to the profile score failing to meet the predetermined metric threshold.

Clause 15. The method according to clause 1, 2, 3, 4, 5, 6, 7, 8, 9, 10, 11, 12, 13 or 14, further including utilizing one or more programmable graphical user interface elements to display an output of the domain name availability determination for the plurality of data items.

Clause 16. A computer-implemented method may include: receiving, by a processor, a request for a plurality of data items from a computing device, the plurality of data items including domain names stored in an external computing device; determining, by the processor, at least one pattern for at least one metric associated with the computing device, the at least one pattern for the at least one metric corresponding to historical data associated with the at least one metric over a predetermined period of time; generating, by the processor, at least one digital code based on the at least one pattern meeting a predetermined metric threshold, the at least one digital code including access to a plurality of resources; assigning, by the processor, the at least one digital code to the computing device to form at least one assigned digital code; allowing, by the processor, based on the at least one assigned digital code, access to the plurality of resources to facilitate performing a domain name availability determination for the plurality of data items; utilizing, by the processor, one or more programmable graphical user interface elements to display an output of the domain name availability determination for the plurality of data items.

Clause 17. The method according to clause 16, further including utilizing a trained machine learning module to predict subsequent domain name availability determinations for particular data items from the profile of the user based on previously generated digital codes.

Clause 18. The method according to clause 16 or 17, further including utilizing a trained machine learning module to analyze a plurality of factors associated with a profile of a user to generate a profile score; dynamically comparing the profile score associated with the profile of the user to a plurality of profile scores associated with other profiles; determining a number of digital tickets to allocate to the profile based on the profile score in correlation with the predetermined metric threshold; and continually monitoring activity associated with the profile to determine when the number of digital tickets are consumed.

Clause 19. The method according to clause 16, 17, or 18, further including further including generating additional authentication steps in response to the profile score failing to meet the predetermined metric threshold.

Clause 20. A system may include: a non-transient computer memory, storing software instructions; at least one processor of a first computing device associated with a user; where, when the processor executes the software instructions, the first computing device is programmed to: receive a request for a plurality of data items from a second computing device, the plurality of data items including domain names stored in an external computing device; determine at least one pattern for at least one metric associated with the second computing device, the at least one pattern for the at least one metric corresponding to historical data associated with the at least one metric over a predetermined period of time; generate at least one digital code based on the at least one pattern meeting a predetermined metric threshold, the at least one digital code comprising access to a plurality of resources; assign the at least one digital code to the computing device to form at least one assigned digital code; and allow based on the at least one assigned digital code, access to the plurality of resources to facilitate performing a domain name availability determination for the plurality of data items.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:
receiving, by a processor, a request for a plurality of data items from a computing device, the plurality of data items comprising domain names stored in an external computing device;
determining, by the processor, at least one pattern for at least one metric associated with the computing device, the at least one pattern for the at least one metric corresponding to historical data associated with the at least one metric over a predetermined period of time;
generating, by the processor, at least one digital code based on the at least one pattern meeting a predetermined metric threshold, the at least one digital code comprising access to a plurality of resources;
assigning, by the processor, the at least one digital code to the computing device to form at least one assigned digital code; and
allowing, by the processor, based on the at least one assigned digital code, access to the plurality of resources to facilitate performing a domain name availability determination for the plurality of data items.

2. The method of claim 1, wherein the computing device is associated with a particular profile.

3. The method of claim 2, wherein the particular profile is associated with a particular user.

4. The method of claim 1, wherein the external computing device comprises a server computing device associated with a domain name generation service.

5. The method of claim 1, further comprising utilizing a trained machine learning module to determine the at least one pattern for the at least one metric associated with the computing device.

6. The method of claim 1, wherein the at least one pattern comprises a pattern of activity associated with a profile of a user associated with the computing device.

7. The method of claim 1, wherein the at least one metric comprises at least one factor associated with a profile score based on an activity of the at least one pattern.

8. The method of claim 1, wherein the at least one digital code comprises a digital ticket that provides access to the plurality of resources.

9. The method of claim 1, wherein the predetermined metric threshold comprises a required number of digital tickets to facilitate the performance of the domain name availability determination for the plurality of data items.

10. The method of claim 1, wherein the at least one assigned digital code comprises a number of digital tickets for consumption to facilitate the performance of the domain name availability determination.

11. The method of claim 1, wherein the plurality of resources comprise a domain availability verification check for the plurality of data items.

12. The method of claim 1, further comprising utilizing a trained machine learning module to predict subsequent domain name availability determinations for particular data items from a profile of a user based on previously generated digital codes.

13. The method of claim 1, further comprising:
utilizing a trained machine learning module to analyze a plurality of factors associated with a profile of a user to generate a profile score;
dynamically comparing the profile score associated with the profile of the user to a plurality of profile scores associated with other profiles;
determining a number of digital tickets to allocate to the profile based on the profile score in correlation with the predetermined metric threshold; and
continually monitoring activity associated with the profile to determine when the number of digital tickets are consumed.

14. The method of claim 13, further comprising generating additional authentication steps in response to the profile score failing to meet the predetermined metric threshold.

15. The method of claim 1, further comprising utilizing one or more programmable graphical user interface elements to display an output of the domain name availability determination for the plurality of data items.

16. A computer-implemented method comprising:
receiving, by a processor, a request for a plurality of data items from a computing device, the plurality of data items comprising domain names stored in an external computing device;
determining, by the processor, at least one pattern for at least one metric associated with the computing device, the at least one pattern for the at least one metric corresponding to historical data associated with the at least one metric over a predetermined period of time;
generating, by the processor, at least one digital code based on the at least one pattern meeting a predetermined metric threshold, the at least one digital code comprising access to a plurality of resources;
assigning, by the processor, the at least one digital code to the computing device to form at least one assigned digital code;
allowing, by the processor, based on the at least one assigned digital code, access to the plurality of resources to facilitate performing a domain name availability determination for the plurality of data items; and
utilizing, by the processor, one or more programmable graphical user interface elements to display an output of the domain name availability determination for the plurality of data items.

17. The method of claim 16, further comprising utilizing a trained machine learning module to predict subsequent domain name availability determinations for particular data items from a profile of a user based on previously generated digital codes.

18. The method of claim 16, further comprising:
utilizing a trained machine learning module to analyze a plurality of factors associated with a profile of a user to generate a profile score;
dynamically comparing the profile score associated with the profile of the user to a plurality of profile scores associated with other profiles;
determining a number of digital tickets to allocate to the profile based on the profile score in correlation with the predetermined metric threshold; and
continually monitoring activity associated with the profile to determine when the number of digital tickets are consumed.

19. The method of claim 18, further comprising generating additional authentication steps in response to the profile score failing to meet the predetermined metric threshold.

20. A system comprises:
a non-transient computer memory, storing software instructions; and
at least one processor of a first computing device associated with a user;
  wherein, when the processor executes the software instructions, the first computing device is programmed to:
    receive a request for a plurality of data items from a second computing device, the plurality of data items comprising domain names stored in an external computing device,
    determine at least one pattern for at least one metric associated with the second computing device, the at least one pattern for the at least one metric corresponding to historical data associated with the at least one metric over a predetermined period of time;
    generate at least one digital code based on the at least one pattern meeting a predetermined metric threshold, the at least one digital code comprising access to a plurality of resources;
    assign the at least one digital code to the computing device to form at least one assigned digital code; and
    allow, based on the at least one assigned digital code, access to the plurality of resources to facilitate performing a domain name availability determination for the plurality of data items.

* * * * *